United States Patent
Wu (10) Patent No.: US 9,152,438 B2
(45) Date of Patent: Oct. 6, 2015

(54) OBJECT LINKING BASED ON A DETERMINED LINKER ORDER

(75) Inventor: Zhao-Ming Wu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 94 days.

(21) Appl. No.: 13/641,243

(22) PCT Filed: Apr. 19, 2010

(86) PCT No.: PCT/CN2010/000524
§ 371 (c)(1),
(2), (4) Date: Oct. 15, 2012

(87) PCT Pub. No.: WO2011/130869
PCT Pub. Date: Oct. 27, 2011

(65) Prior Publication Data
US 2013/0042225 A1   Feb. 14, 2013

(51) Int. Cl.
*G06F 9/44* (2006.01)
*G06F 9/45* (2006.01)
*G06F 9/445* (2006.01)

(52) U.S. Cl.
CPC ........... *G06F 9/44521* (2013.01); *G06F 8/68* (2013.01); *G06F 9/44536* (2013.01); *G06F 9/4428* (2013.01)

(58) Field of Classification Search
CPC ..... G06F 9/4428; G06F 9/44521; G06F 8/54; G06F 8/71; G06F 8/24; G06F 8/68; G06F 9/44536
See application file for complete search history.

(56) References Cited

U.S. PATENT DOCUMENTS

| | | | |
|---|---|---|---|
| 6,789,255 B1* | 9/2004 | Pedrizetti et al. | 717/169 |
| 7,210,141 B1* | 4/2007 | Nathan et al. | 717/168 |
| 7,529,779 B2 | 5/2009 | Herle et al. | |
| 7,689,982 B1* | 3/2010 | Chen et al. | 717/168 |
| 8,141,069 B2* | 3/2012 | Koehler | 717/165 |
| 8,214,821 B1* | 7/2012 | Bartel et al. | 717/168 |
| 2002/0144254 A1* | 10/2002 | Owada | 717/171 |
| 2004/0117782 A1* | 6/2004 | Lo | 717/165 |
| 2005/0039177 A1* | 2/2005 | Burke | 717/165 |
| 2005/0278715 A1* | 12/2005 | Herle et al. | 717/162 |
| 2006/0200815 A1* | 9/2006 | Li | 717/168 |
| 2006/0265705 A1* | 11/2006 | Holt | 717/169 |

(Continued)

FOREIGN PATENT DOCUMENTS

EP   0472812 A1   3/1992

OTHER PUBLICATIONS

ARM, Using Scatter-loading description files, 2001, pp. 1-33.*

(Continued)

*Primary Examiner* — Thuy Dao
*Assistant Examiner* — Mongbao Nguyen
(74) *Attorney, Agent, or Firm* — Norton Rose Fulbright US LLP (57) ABSTRACT

Example embodiments relate to a mechanism for linking objects to obtain an executable file. In particular, example embodiments include a mechanism that determines a linker order for a plurality of objects included in a version of an executable file and a mechanism that generates a scatter loading file for the version of the executable file, the scatter loading file ordering the plurality of objects using the linker order. Example embodiments also include a mechanism that links the plurality of objects using the scatter loading file to create the version of the executable file.

15 Claims, 6 Drawing Sheets

(56) References Cited

U.S. PATENT DOCUMENTS

| | | | |
|---|---|---|---|
| 2007/0050762 A1* | 3/2007 | Chen et al. | 717/169 |
| 2007/0079306 A1 | 4/2007 | Qumei | |
| 2007/0089108 A1* | 4/2007 | Chen et al. | 717/168 |
| 2007/0130565 A1* | 6/2007 | Fan et al. | 717/173 |
| 2007/0294683 A1* | 12/2007 | Lee et al. | 717/162 |
| 2008/0098377 A1* | 4/2008 | Barnak | 717/162 |
| 2008/0098378 A1* | 4/2008 | Kilbane et al. | 717/162 |
| 2008/0117991 A1 | 5/2008 | Peddireddy et al. | |
| 2008/0184220 A1* | 7/2008 | Chen et al. | 717/171 |
| 2008/0301658 A1* | 12/2008 | El-Kersh | 717/165 |
| 2009/0144708 A1* | 6/2009 | Deedwaniya et al. | 717/140 |
| 2009/0172338 A1 | 7/2009 | Eker et al. | |
| 2009/0328024 A1 | 12/2009 | Li et al. | |
| 2010/0077387 A1* | 3/2010 | Callaghan et al. | 717/140 |
| 2010/0169875 A1* | 7/2010 | Stewart | 717/170 |

OTHER PUBLICATIONS

Binghua Duan's Linux & Android Blog, Scatter Loading Mechanism in ADS, 2006, pp. 1-5.*

Adam Dunkels, Run-time Dynamic Linking for Reprogramming Wireless Sensor Networks, 2006, pp. 1-14.*

Brian Gough, An Introduction to GCC, 2004, pp. 7-15.*

Weiyi Ge, Object Link Structure in the Semantic Web, 2010, pp. 257-270.*

David M. Beazley, The Inside Story on Shared Libraries and Dynamic Loanding, 2001, pp. 90-97.*

International Search Report and Written Opinion received in PCT Application No. PCT/CN2010/000524, mailed Jan. 20, 2011, pp. 11.

Carl Von Platen, et al., "Feedback Linking: optimizing object code layout for updates," 2006, pp. 2-11, <URL: http://portal.acm.org/citation.cfm?id1134650.1134653&collACM&dlACM&CFID75634853&CFTOREN 32556789>.

De Bus, et al., "Link-time optimization of ARM binaries," Publication date 2004, On pp. 211-220, <URL: http://portal.acm.org/citation.cfm?id997163.997194&collACM&dlACM&CFID75634853&CFTOREN 32556789>.

De Sutter, et al., "Link-time compaction and optimization of ARM executables," ACM transactions on Embedded Computing Systems (TECS),2007, vol. 6 (1), <URL: http://portal.acm.org/citation.cfm?id1210268.1210273&collACM&dlACM&CFID75634853&CFTOREN 32556789>.

* cited by examiner

OBJECT LINKING BASED ON A DETERMINED LINKER ORDER

BACKGROUND

Computer programs, which may be implemented in the form of software or firmware executable on a computing device, are susceptible to errors or faults that cause incorrect or unexpected results during execution. Such errors or faults are more commonly known as "bugs." In situations where a bug will affect performance, render a product unstable, or affect the usability of the product, the developer may find it advisable to release a software or firmware update to correct the problem. A developer may also release an update to add additional features or improve performance of the product. In general, the update includes a number of instructions used to transform the existing version stored on the user device to the updated version.

In a typical implementation, a developer transmits the software or firmware update package to the user over a wired or wireless network. For example, when the user device is a mobile phone, portable reading device, or other portable device, the user may receive the update over a cellular or other wireless network. Similarly, when the user device is a desktop or laptop computer, the user may receive the update over a wired network.

Regardless of the transmission medium used to transmit the update to the user, it is desirable to minimize the size of the update package. By making the update package as small as possible, the developer may reduce the amount of time required to transmit the update to the user and to install the update on the user's device, thereby resulting in an increase in the user's satisfaction. Similarly, minimizing the size of the update package reduces bandwidth usage, thereby reducing costs to both the user and the network provider. Existing solutions employ a number of techniques in an attempt to generate an update package of minimal size, but, ultimately, could be improved to further decrease download time, bandwidth usage, and installation time.

BRIEF DESCRIPTION OF THE DRAWINGS

In the accompanying drawings, like numerals refer to like components or blocks. The following detailed description references the drawings, wherein.

DETAILED DESCRIPTION

As detailed above, existing solutions for generating an update package could be improved to further decrease the size of the resulting update package. Thus, as described below, various example embodiments relate to a process for linking executable files in a manner that reduces the size of a subsequently-generated update package.

In particular, in some embodiments, a linker order may first be determined for a plurality of objects to be included in a version of an executable file. This linker order may identify the ordering of the plurality of objects if they were to be placed in a single execution region of the file. A scatter loading file may then be generated using the determined ordering of the plurality of objects. Finally, a linked executable file may be obtained by linking the objects using the scatter loading file. By applying this procedure to each version of the executable file, the size of update packages for updating from one version of the executable to the next may be minimized. In particular, since each executable file will follow a similar object ordering, the changes required in the update package will be minimized, thereby reducing the size of the package and the installation time. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
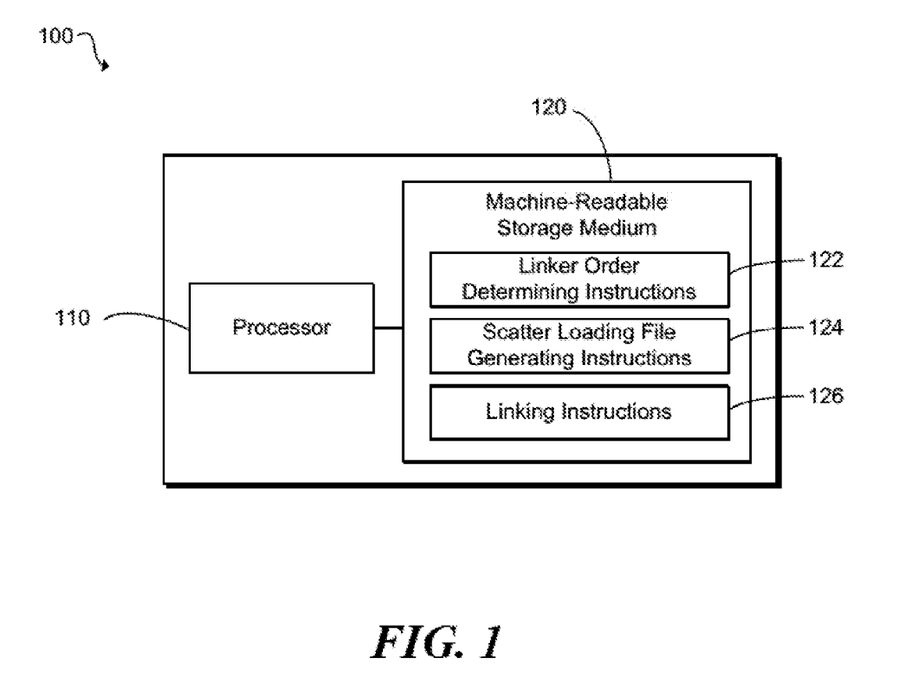
FIG. 1 is a block diagram of an example computing device including a machine-readable storage medium encoded with instructions for linking a plurality of objects using a scatter loading file generated based on a determined linker order.

Referring now to the drawings, FIG. 1 is a block diagram of an example computing device 100 including a machine-readable storage medium 120 encoded with instructions for linking a plurality of objects using a scatter loading file generated based on a determined linker order. Computing device 100 may be, for example, a desktop computer, a laptop computer, a server, a workstation, or the like. In the embodiment of FIG. 1, computing device 100 includes a processor 110 and a machine-readable storage medium 120.

Processor 110 may be a central processing unit (CPU), a semiconductor-based microprocessor, or any other hardware device suitable for retrieval and execution of instructions stored in machine-readable storage medium 120. Machine-readable storage medium 120 may be encoded with executable instructions for determining a linker order, generating a scatter loading file based on the determined linker order, and linking the objects using the generated scatter loading file. Thus, processor 110 may fetch, decode, and execute the instructions 122, 124, 126 encoded on machine-readable storage medium 120 to implement the functionality described in detail below.

In particular, machine-readable storage medium 120 may include linker order determining instructions 122, which may determine a linker order for a plurality of objects to be included in a particular version of an executable file. Linker order determining instructions 122 may determine the ordering of the objects if the objects were linked by a particular linker and, more specifically, the ordering of the objects when the linker is required to make a decision on its own regarding the order in which objects should be placed. As described below, this object ordering may then be provided as input to scatter loading file generation instructions 124.

Each object processed by linker order determining instructions 122 may be a file comprising a number of executable instructions, which may be, for example, in machine code format. The objects (sometimes referred to as "binaries") may be obtained by, for example, compiling or assembling a source code file using a compiler or assembler suitable for the particular programming language used by a developer. As a specific example, when the linker to be used is the Advanced Reduced Instruction Set Machine (ARM) linker, the objects may be in Executable and Linkable Format (ELF). Other suitable objects will be apparent to those of skill in the art depending on the specific linker to be employed.

Furthermore, each object may include external references to one or more libraries, which may each include one or more objects for implementing commonly-utilized routines. For example, a particular object may reference a standard library used to implement a custom data type or provide some other preconfigured functionality. When the linker to be used is the ARM linker, the object libraries may be in ELF format or, alternatively, provided in an archive file containing a collection of ELF files. Other suitable libraries referenced by the object files and file formats for those libraries will be apparent to those of skill in the art depending on the particular compiler or assembler used in generation of the objects.

In operation, linker order determining instructions 122 may read the plurality of objects and run a series of instructions to determine the ordering assigned to the objects by a particular linker. This ordering may correspond to, for example, the ordering of the objects if the objects were to be placed in a single execution region (also known as an inner link ordering). In other words, linker order determining instructions 122 may determine the ordering assigned by the linker when the linker is required to make an ordering decision between two or more objects located in the same execution region.

In some embodiments, instructions 122 may run a simulation to determine the ordering in which the objects would be placed by the particular linker if they were provided to the linker as input. For example, instructions 122 may first identify the objects to be included in a particular linked executable and then identify any library objects referenced by the objects. Linker order determining instructions 122 may then determine the ordering of each of the objects and referenced library objects within a linked executable.

In executing such a simulation, linker order determining instructions 122 may determine the ordering of the objects using object ordering properties of the applicable linker. These object ordering properties may identify an order in which objects are placed in a executable linked by the particular linker when the linker is required to make an ordering decision between two objects. For example, when the linker is an ARM linker, linker order determining instructions 122 may be aware that the ordering for objects within a particular region is based on, in order: (1) attributes of each object; (2) object names in alphanumeric order; and (3) positioning in the input list. Furthermore, in an ARM linker, objects included in referenced libraries are generally placed after the objects provided as input to the linker. Other suitable factors used in ordering objects within a linked executable will be apparent to those of skill in the art depending on the particular linker.

As an alternative to a simulation, linker order determining instructions 122 may determine the ordering by launching the linker one or more times using the objects to be included in the linked executable. For example, linker order determining instructions 122 may launch the linker using two objects until an ordering is determined for every pair of objects. In particular, linker order determining instructions 122 may provide two objects as input to the linker, specifying that both objects should be placed in the same execution region (e.g., by using a simple scatter loading file).

As a specific example, when there are three objects to be ordered, A, B, and C, linker order determining instructions 122 may launch the executable using the following combinations: (1) AB: (2) AC; and (3) BC. Linker order determining instructions 122 may then determine the order assigned to each of the objects in each of the resulting executables. In this manner, linker order determining instructions 122 may generate an ordered list of objects based on the ordering of each pair. This procedure may be used for any group of n objects by launching the linker using a number of distinct pairs equal to n! divided by (2*(n−2)!).

Regardless of the method used to determine the linker order, after linker order determining instructions 122 obtain the linker order, the order may be provided to scatter loading file generating instructions 124. Using the provided linker order, scatter loading file generating instructions 124 may generate a scatter loading file to be used in linking the executable file in the order determined by linker order determining instructions 122. It should be noted that, although commonly used in connection with an ARM linker, the term "scatter loading file" is not limited to ARM linkers as described herein. Rather, as used herein, a scatter loading file may include any set of parameters provided as input to a particular linker to specify an ordering of objects in the linked executable.

As an example, scatter loading file generating instructions 124 may first read the order received from linker order determining instructions 122. Scatter loading file generating instructions 124 may then generate an output file to be used to instruct the linker to place the objects in the executable in the specified order. For example, when the linker is an ARM linker, scatter loading file generating instructions 124 may create a scatter loading file including a plurality of execution regions. The ordering of the objects within and between each of the execution regions may be the same as the ordering received from linker order determining instructions 122.

Thus, as an example, when the linker to be used is an ARM linker, a particular scatter loading file may include execution regions ordered first based on the attribute (e.g., read-only code, then read-only data, then read-write code, then zero-initialized data, etc.). Within sets of objects including the same attribute, the objects may be ordered in alphanumeric order based on the ASCII character sequence. Finally, when two or more objects have the same attribute and name, the objects may be ordered in the scatter loading file based on a position to be used in the input list provided to the linker.

Scatter loading file generating instructions 124 may provide the generated scatter loading file to linking instructions 126, which may launch the linker program using the objects and the scatter loading file as input. For example, when the linker is an ARM linker, linking instructions 126 may launch the "armlink" command, providing each of the objects as input and identifying the scatter loading file using the "-scatter" input parameter. Linking instructions 126 may then obtain the outputted linked executable, which may contain an object ordering corresponding to the ordering determined by linker order determining instructions 122.

By applying linker order determining instructions 122, scatter loading file generating instructions 124, and linking instructions 126 to each version of an executable file (e.g., a first version including a first plurality of objects and a second version including a second plurality of objects), each version may be based on the linker ordering for the objects. In particular, because the ordering within the scatter loading file reflects the actual linker inner order, the ordering within execution regions of the linked executable may be identical to the ordering in the scatter loading file. For example, when using a typical scatter loading file with the ARM linker, the ordering of objects within a particular execution region may be different from the ordering contained in the scatter loading file, as the ARM linker applies an inner section ordering to each execution region. By mapping the ordering of the scatter loading file to the inner ordering, embodiments disclosed herein ensure that the ordering in the scatter loading file is the same as the ordering in the linked executable. By applying this process to each version of the executable, the differences between each version of the executable may be minimized, thereby decreasing the size of the update package.

Figure 2:
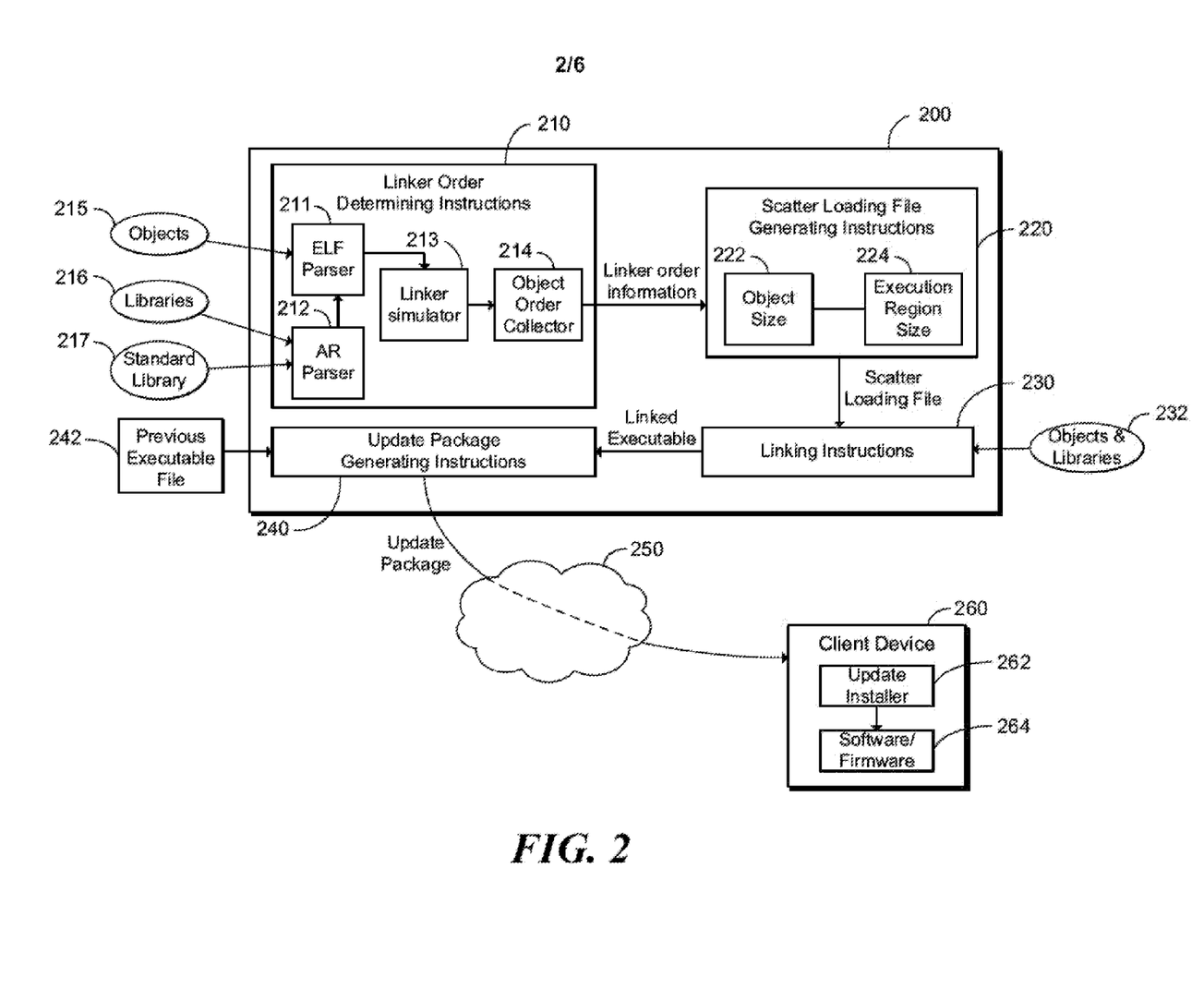
FIG. 2 is a block diagram of an example system including a computing device for generating an update package and a client device for receiving and installing the update package.

FIG. 2 is a block diagram of an example system including a computing device 200 for generating an update package and a client device 260 for receiving and installing the update package. As illustrated, the system may include a computing device 200, a network 250, and a client device 260. As described in detail below, reference is made to an ARM Linker and related file types. It should be apparent, however, that the embodiment of FIG. 2 may be adapted to any linker type that allows for user specification of an ordering of objects.

As with computing device 100 of FIG. 1, computing device 200 may be, for example, a desktop computer, a laptop computer, a server, a workstation, or the like. Computing device 200 may include a processor (not shown) for executing instructions 210, 220, 230, 240. Instructions 210, 220, 230, 240 may be encoded on a machine-readable storage medium (not shown) for retrieval and execution by the processor.

Linker order determining instructions 210 may include an Executable and Linkable Format (ELF) parser 211, an archive (AR) parser 212, a linker simulator 213, and an object order collector 214. Each of these components may be implemented in the form of executable instructions encoded on a machine-readable storage medium of computing device 200.

ELF parser 211 may receive a plurality of objects 215 as input and, in response, determine an identity of each object (e.g., a file name or other identifier). In addition, ELF parser 211 may identify the attributes of each area within an object. For example, a particular object may include read-only code, read-only based data, read-only data, read-write code, based data, other initialized data, and/or zero-initialized data.

ELF parser 211 may then parse the plurality of objects 215 to identify any object libraries referenced by the plurality of objects 215. In particular, ELF parser may read through the contents of each object 215 to identify any unresolved references to external objects. For example, a particular object of the plurality of objects 215 may reference a functionality provided by one or more user-specified libraries 216 or standard libraries 217. As described below, AR parser 212 may provide a listing of each of the objects contained in user-specified libraries 216 and standard library 217. In response to receipt of this listing, ELF parser 211 may determine a list of library objects referenced by each of the objects 215 received as input. For example, if a.o is included as an input object 215 and references d.o and e.o in A.lib, ELF parser 211 may identify a.o, d.o, and e.o as the objects to be included in the linked executable. After compiling a listing of each of the objects included in and referenced by the plurality of objects 215, ELF parser 211 may forward the listing to linker simulator 213, described in further detail below.

AR parser 212 may receive user-specified libraries 216 and standard libraries 217 as input and, in response, identify any objects included in each library. AR parser 212 may then transmit each of the identified libraries to ELF parser 211, which, as described above, may identify any objects in the libraries 216, 217 referenced by the plurality of objects 215.

Linker simulator 213 may receive, as input, the objects identified by ELF parser 211 and any libraries referenced by those objects as parsed by AR parser 212. In response to receipt of this listing of objects to be included in the executable, linker simulator 213 may determine a linker ordering of the objects. As an example, linker simulator 213 may use object ordering properties of the particular linker to determine an order in which the linker would arrange the objects. In some embodiments, each of the objects 215 may be placed first, followed by any objects in the libraries 216, 217 in the order that they are referenced in the objects 215.

As an example, when the linker is an ARM linker, linker simulator 213 may first determine a grouping of the objects based on their attributes (e.g., read-only, read-write, zero-initialized, etc.). Linker simulator 213 may then determine an ordering to be applied within each attribute group. For example, linker simulator 213 may first order all objects 215 based, for example, on an alphanumeric ordering of the objects, then order any objects in libraries 216, 217 in the order they are referenced by the objects. Finally, when two objects of a particular attribute type have the same name, linker simulator 213 may order the objects based on the position in which the objects will be located in the linker input order.

In this manner, linker simulator 213 may determine a linker order that corresponds to the linker inner ordering that would be assigned to the objects if the linker was launched using the group of objects. More specifically, the linker inner ordering of a linker may correspond to the ordering of objects within a linked executable and linker simulator 213 may determine this ordering by analyzing the input objects 215 and libraries 216, 217. In some embodiments, the ordering determined by linker simulator 213 may also correspond to the order of the objects 215 under the assumption that the objects were placed in a single execution region. In other words, the linker order may identify the ordering of the objects that would be applied by the linker to resolve object placement conflicts in the linked executable.

Object order collector 214 may receive the object ordering information determined by linker simulator 213 and compile this information into a linker order listing. The linker order listing may be a sorted list identifying the position of each object included in objects 215 or included in libraries 216, 217 and referenced by one of the objects 215. After compiling the linker order information, object order collector 214 may then output the determined linker order to scatter loading file generating instructions 220.

In response to receipt of linker order information, scatter loading file generating instructions 220 may be configured to generate a scatter loading file used to link the objects 215, 216, 217 in the determined linker order. In particular, scatter loading file generating instructions 220 may first determine a size of each object 222 of the plurality of objects 215 and of any referenced library objects 216, 217. Scatter loading file generating instructions 220 may also determine a maximum execution region size 224 by, for example, accessing stored information regarding the linker to be used.

Scatter loading file generating instructions 220 may then organize the plurality of objects into a number of execution regions using the size of each object 222 and the maximum region size 224. More specifically, scatter loading file generating instructions 220 may sequentially traverse the linker order information, placing each identified object in an execution region until reaching a maximum size of the execution region, at which point instructions 220 may create a new execution region and continue with the process. In some embodiments, at the end of the process, the resulting scatter loading file may explicitly list every object 215 and all library objects 216, 217 referenced by the objects 215. Such embodiments are advantageous, as they ensure that all objects 215, 216, 217 are placed in the linked executable in the order specified in the generated scatter loading file.

The generated scatter loading file may then be provided to linking instructions 230. Linking instructions 230 may, in response, trigger a linking procedure using the appropriate linker. The linker may receive, as input, the scatter loading file and objects and libraries 232, which may be the same as the objects 215 and libraries 216, 217 provided to linker order determining instructions 210. The linker may then generate a linked executable using the ordering specified in the scatter loading file. Because the ordering within execution regions of the scatter loading file is the same as the linker inner ordering, the objects in the resulting linked executable may be in the same order as the scatter loading file.

In response to receipt of the linked executable from linking instructions 230, update package generating instructions 240 may generate an update package to update a previous executable file 242 to the new version. In particular, update package generating instructions 240 may generate an executable file containing instructions for creating the new version of the executable file using the previous executable file 242. For example, the update package may contain a series of copy commands indicating sections of the new version that are identical to previous executable file 242 and a series of set commands indicating data to be used for non-matching sections of previous executable file 242. Other suitable methods for generating the update package will be apparent to those of skill in the art.

Because previous executable file 242 may have been generated using instructions 210, 220, 230, the similarity in the ordering of objects contained in the new and previous executable files may be maximized. As a result, the number of commands required to transform the previous executable file 242 to the new version will be minimized, thereby reducing the total size of the resulting update package and minimizing the installation time on the client device 260.

For example, when the new executable file only removes a particular object from previous executable file 242, the linker order determined by linker order determining instructions 210 will be the same, with the exception of the removal of the particular object. As another example, when the new executable file only adds a particular object to previous executable file 242, the determined linker order will be the same, with the exception of the addition of the particular object. As yet another example, when the objects included in the new executable file and previous executable file 242 are the same, the determined linker order will be identical. As a result, in each of these examples, the scatter loading file will be very similar and the linked executables will therefore also be very similar. As a result, changes reflected in the update package will be minimal.

After generation of the update package, computing device 200 may prepare the update package for distribution to the client base. For example, the two versions of the executable file may be software or firmware included in a set of client devices, which may include a particular client device 260. Thus, client device 260 may be notified of the availability of an update package and initiate a download of the update package from computing device 200 via network 250, which may be any packet-switched or circuit-switched network (e.g., the Internet).

Client device 260 may be any computing device suitable for execution of software and firmware. For example, client device 260 may be a desktop or laptop computer, a mobile phone, a portable reading device, or the like. Client device 260 may include software or firmware 264 to be updated and an update installer 262 for installing a received update package. Upon receipt of an update package, client device 260 may execute update installer 262 to process the update package and modify the previous version of the software/firmware 264 using the instructions contained therein.

Figure 3:
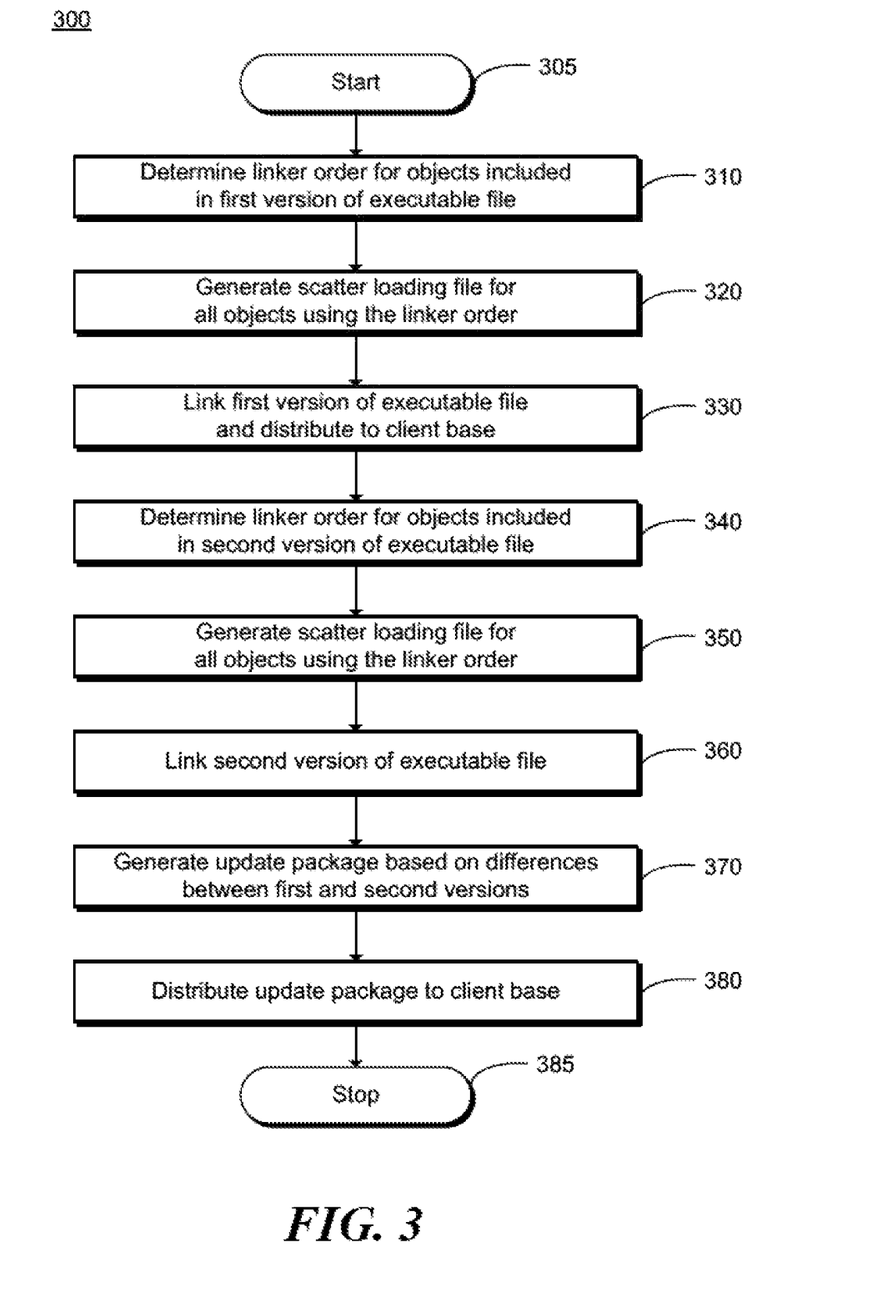
FIG. 3 is a flowchart of an example method for generating an update package based on two versions of an executable, where each version of the executable is linked using a scatter loading file generated based on a determined linker order.

FIG. 3 is a flowchart of an example method 300 for generating an update package based on two versions of an executable, each linked using a scatter loading file generated based on a determined linker order. Although execution of method 300 is described below with reference to the components of computing device 200, other suitable components for execution of method 300 will be apparent to those of skill in the art. Method 300 may be implemented in the form of executable instructions stored on a machine-readable storage medium, such as a machine-readable storage medium included in computing device 200.

Method 300 may start in block 305 and proceed to block 310, where computing device 200 may determine a linker order for objects included in a first version of an executable file. In particular, computing device 200 may read the plurality of objects and execute a series of instructions to determine the inner object ordering imposed on the objects by a particular linker. As an example, computing device 200 may run a simulation to determine the ordering in which the objects would be placed by the particular linker if they were provided to the linker as input. In running this simulation, computing device 200 may utilize known object ordering properties of the particular linker. Alternatively, computing device 200 may launch the linker one or more times to determine how the linker would order two or more objects when required to make an ordering decision between the objects. Additional implementation details for some embodiments are provided above in connection with linker order determining instructions 122, 210.

After determining the linker order, method 300 may then proceed to block 320, where computing device 200 may generate a scatter loading file for the objects to be included in the first version of the executable file using the linker order determined in block 310. In particular, computing device 200 may organize the objects to be included in the executable into a number of execution regions in an order corresponding to the determined linker order. Additional implementation details for some embodiments are provided above in connection with scatter loading file generating instructions 124, 220.

Method 300 may then proceed to block 330, where computing device 200 may link the objects using the first scatter loading file to create the first version of the executable file. In particular, computing device 200 may launch the particular linker providing, as input, the scatter loading file and each of the objects considered in blocks 310 and 320.

After creating the first version of the executable file, the executable may be distributed to a client base. For example, the first executable may be firmware or software that is pre-installed on client devices during a manufacturing or customization stage of the device. Alternatively, the first executable may be installed on the client device by a user upon obtaining the executable online or in a brick-and-mortar store.

Method 300 may then proceed to block 340, where computing device 200 may determine the linker order for objects to be included in a second version of an executable file. The second version of the executable file may be, for example, a software update, a firmware upgrade, or any other modification of the first version of the executable file. In block 340, computing device 200 may perform processing similar to that of block 310. In particular, computing device 200 may determine an inner ordering imposed by the linker of the objects included in the second version by simulating the linking process or by launching the linker.

After determining the linker order, method 300 may proceed to block 350, where computing device 200 may generate a scatter loading file for the objects to be included in the second executable using the link order determined in block 340. The processing performed by computing device 200 in block 350 may be similar to the processing of block 320. Thus, computing device 200 may organize the objects to be included in the second version of the executable into a number of execution regions in an order corresponding to the linker order determined in block 340.

Method 300 may then proceed to block 360, where computing device 200 may link the second plurality of objects using the second scatter loading file to create the second version of the executable file. After the second executable file is obtained through the linking process, method 300 may proceed to block 370, where computing device 200 may generate an update package based on the differences between the first and second versions of the executable. In particular, the update package may contain instructions to generate the second version of the executable file using the first version of the executable file.

Method 300 may then proceed to block 380, where computing device 200 may distribute the update package to the client base. For example, computing device 200 may transmit the update package to client devices 260 via a network 250, such as the Internet. Upon receipt of the update package, each client device 260 may run the update package to upgrade the software or firmware. Method 300 may then proceed to block 385, where method 300 may stop.

Figure 4:
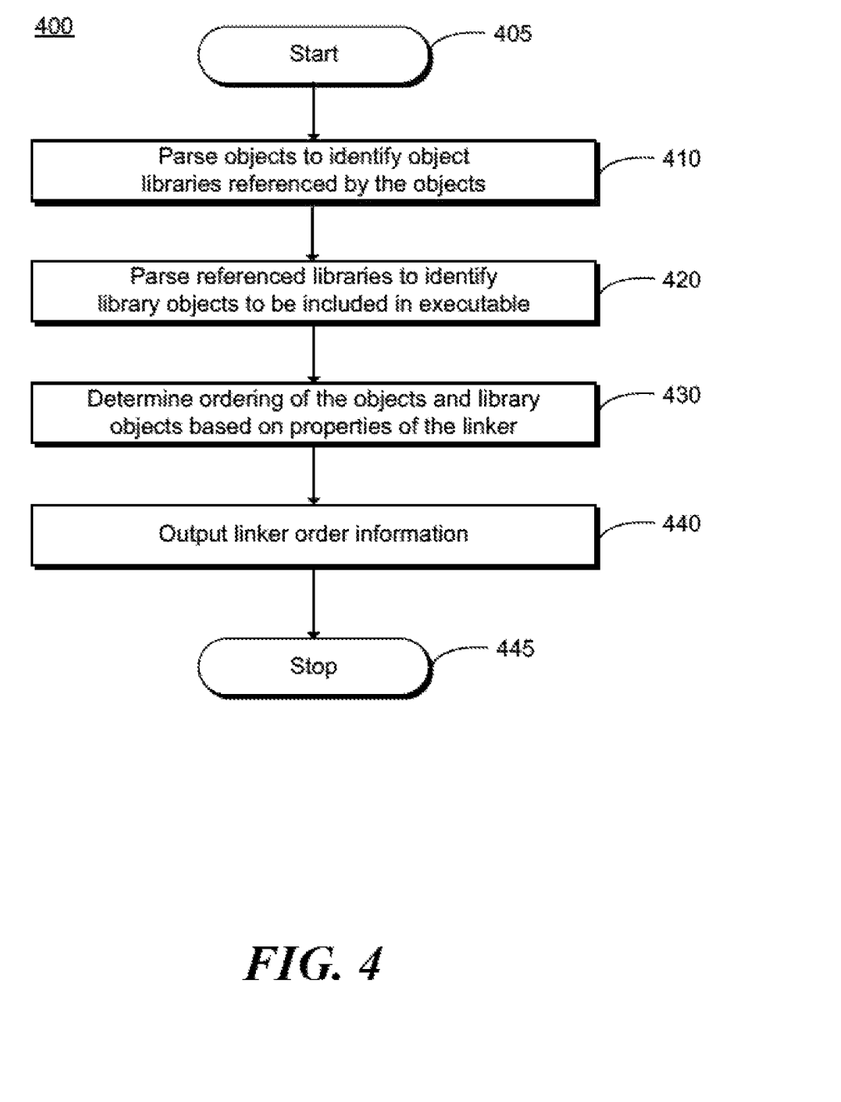
FIG. 4 is a flowchart of an example method for determining a linker order for a plurality of objects to be included in an executable file.

FIG. 4 is a flowchart of an example method 400 for determining a linker order for a plurality of objects to be included in an executable file. Method 400 may be, for example, a specific implementation of blocks 310 and 340 of FIG. 3. Although execution of method 400 is described below with reference to the components of computing device 200, other suitable components for execution of method 400 will be apparent to those of skill in the art. Method 400 may be implemented in the form of executable instructions stored on a machine-readable storage medium, such as a machine-readable storage medium included in computing device 200.

Method 400 may start in block 405 and proceed to block 410, where computing device 200 may parse the input objects to identify object libraries referenced by the plurality of objects. For example, computing device 200 may identify each object of the plurality of objects that references one or more user-specified or standard libraries and, for each such object, identify the referenced libraries.

Method 400 may then proceed to block 420, where computing device 200 may parse the identified object libraries to identify the library objects to be included in the executable. More specifically, computing device 200 may extract the constituent objects from each library and compare the extracted libraries to the object libraries identified in block 410. In this manner, computing device 200 may compile a listing of all objects to be included in the executable file. This listing of objects may include the input objects, referenced objects in user-specified libraries, and referenced objects in standard libraries.

Method 400 may then proceed to block 430, where computing device 200 may determine the ordering of the input objects and library objects. In some embodiments, computing device 200 may determine the ordering of the objects based on properties of the particular linker to be used. For example, when the linker is an ARM linker, computing device 200 may first determine a group of the objects based on their attributes (e.g., read-only, read-write, zero-initialized, etc.). Computing device 200 may then determine an ordering to be applied within each attribute group based on an ASCII ordering of the objects. Thus, in some embodiments, the linker order may be determined based on an assumption that all objects are to be included in a single execution region. Stated differently, computing device 200 may determine an order applied by the particular linker for all objects when the linker makes ordering decisions on its own (rather than making the decision based on user instructions). The resulting list may be a list of objects in an order to be identified in the scatter loading file.

After determining the object order in block 430, method 400 may proceed to block 440, where computing device 200 may output the linker order information for use in generating a scatter loading file. Finally, method 400 may proceed to block 445, where method 400 may stop.

Figure 5:
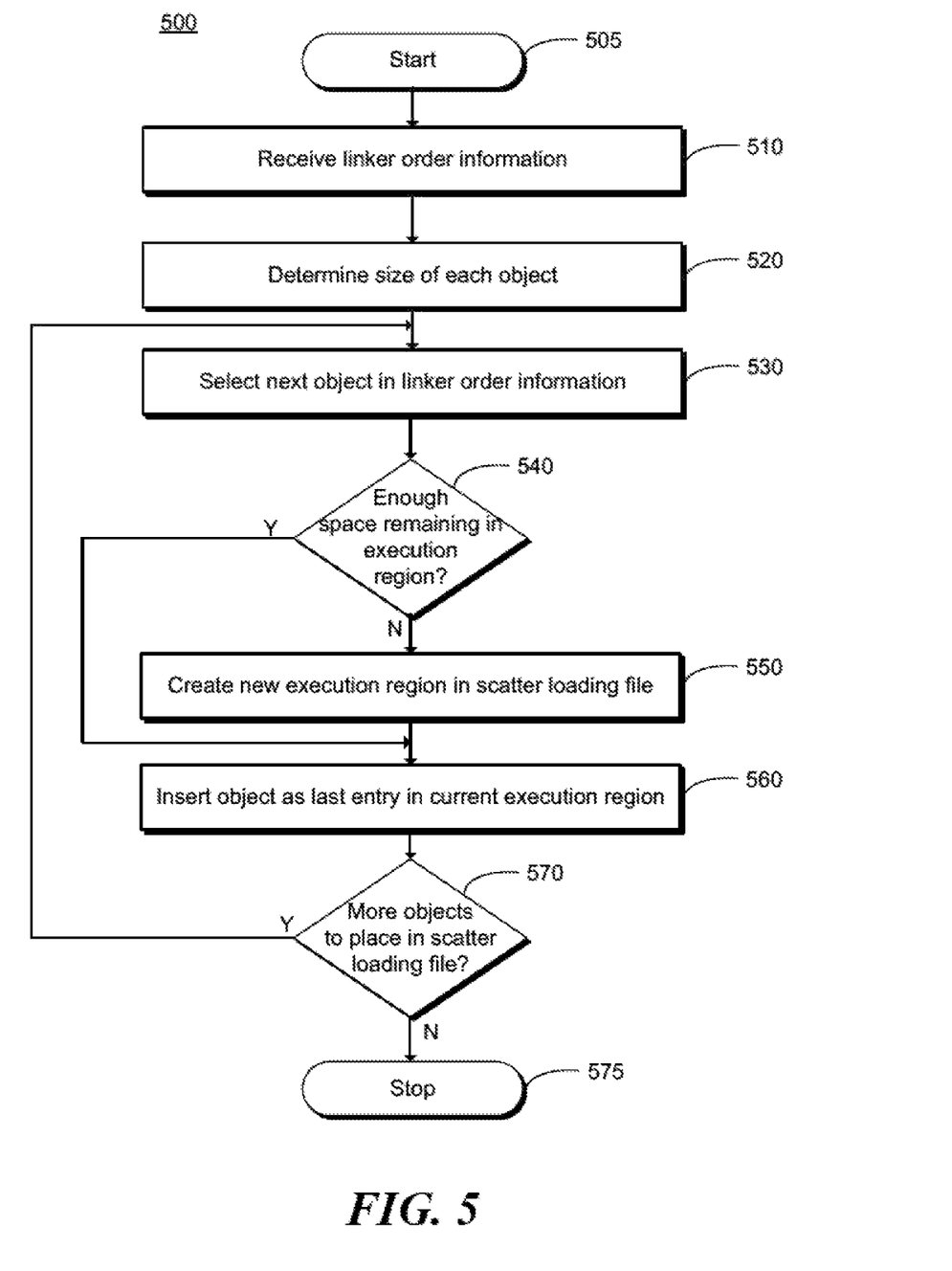
FIG. 5 is a flowchart of an example method for generating a scatter loading file using a linker order.

FIG. 5 is a flowchart of an example method 500 for generating a scatter loading file using a linker order. Method 500 may be, for example, a specific implementation of blocks 320 and 350 of FIG. 3. Although execution of method 500 is described below with reference to the components of computing device 200, other suitable components for execution of method 500 will be apparent to those of skill in the art. Method 500 may be implemented in the form of executable instructions stored on a machine-readable storage medium, such as a machine-readable storage medium included in computing device 200.

Method 500 may start in block 505 and proceed to block 510, where computing device 200 may receive the link order information. In particular, as described in detail above, the link order information may identify the ordering of input objects and library objects to be included in the executable file. Method 500 may then proceed to block 520, where computing device 200 may determine the size of each object to be included in the executable file. For example, computing device 200 may determine a total number of bytes included in each input object and library object included in the link order information.

After determining the size of each of the objects, method 500 may proceed to block 530, where computing device 200 may select the next object identified in the linker order information. Method 500 may then proceed to block 540, where computing device 200 may determine whether sufficient space remains in the current execution region for inclusion of the object selected in block 530. When there is enough space in the execution region, method 500 may skip to block 560, described in detail below. Alternatively, when it is determined that there is insufficient space in the current execution region to include the currently-selected object, method 500 may proceed to block 550.

In block 550, computing device 200 may create a new execution region in the scatter loading file. In particular, computing device 200 may create an execution region in a current load region to specify a memory region for storage of one or more objects during execution of the linked executable. In creating the execution region, computing device 200 may identify a name of the region and a base address or address offset from a previous execution region. In some embodiments, in addition to creating a new execution region, computing device 200 may also create a new load region that contains one or more execution regions (including the execution region just created). A load region may be used to specify a region of memory for use by one or more objects prior to execution of the linked executable.

Method 500 may then proceed to block 560, where computing device 200 may insert the currently-selected object as the last entry in the current execution region. In particular, computing device 200 may place the currently-selected object into an input section, including an area description identifying the name of the object and area attributes of the particular object. For example, in listing an object A with a read-only attribute, computing device 200 may insert an entry, "A.o (+RO)." Similarly, in listing an object B with a read-write attribute, computing device 200 may insert an entry, "B.o (+RW)." Other suitable execution region entries will be apparent to those of skill in the art depending on the particular linker.

Method 500 may then proceed to block 570, where computing device 200 may determine whether there are additional objects to be placed in the scatter loading file. When it is determined that there are additional objects, method 500 may return to block 530 for processing of the next object in the linker order information. Alternatively, when there are no additional objects to be included in the scatter loading file, method 500 may proceed to block 575, where method 500 may stop.

Figure 6:
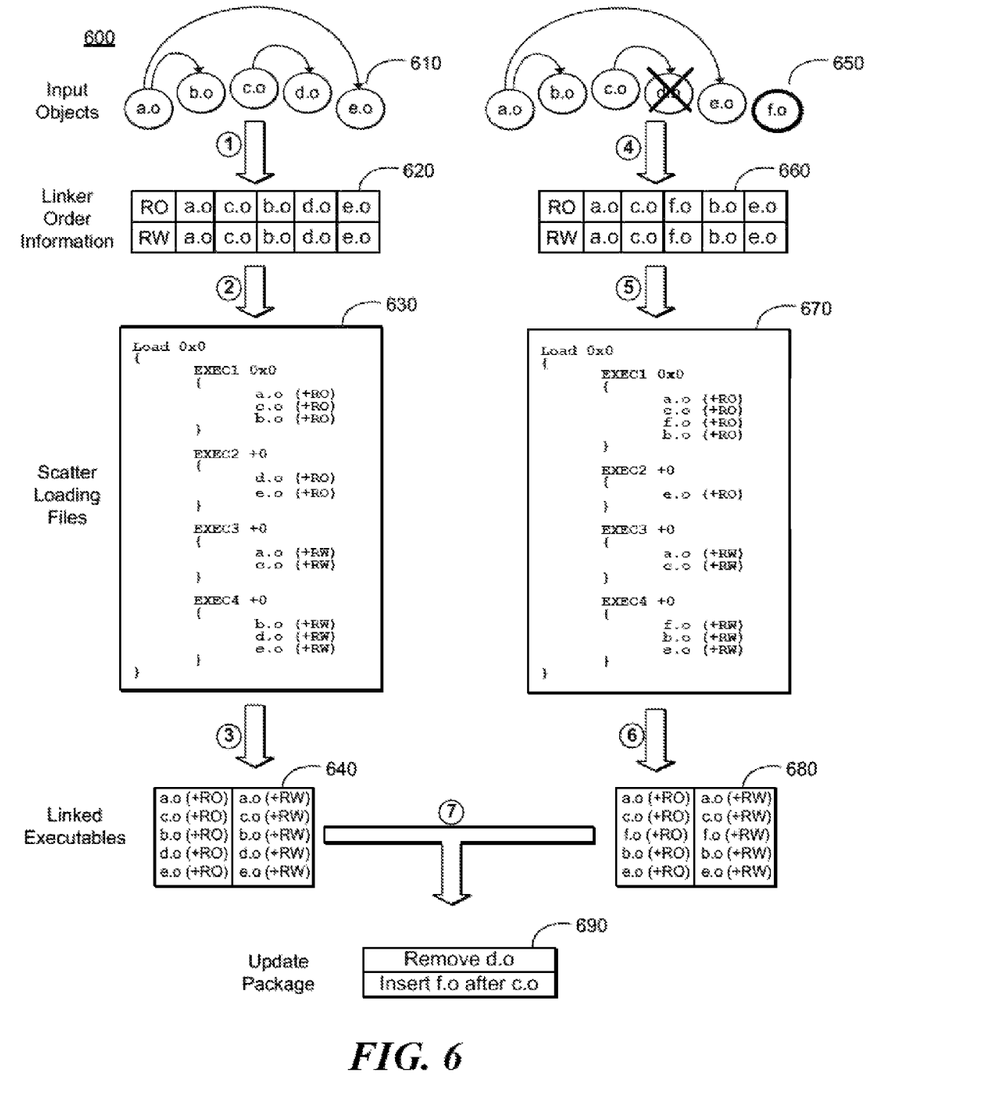
FIG. 6 is a block diagram of an example operation flow for generating an update package based on two versions of an executable file, where each version is linked using a scatter loading file generated based on a determined linker order.

FIG. 6 is a block diagram of an example operation flow 600 for generating an update package based on two versions of an executable file, each linked using a scatter loading file generated based on a determined linker order. Although operation flow 600 is described below with reference to the components of computing device 200, other suitable components for implementation of operation flow 600 will be apparent to those of skill in the art.

As illustrated in operation flow 600, computing device 200 may initially receive a first plurality of input objects 610 with instructions to determine a linker order of the objects. As illustrated, input objects 610 may include an object, a.o., which references two objects in libraries, b.o and e.o. Similarly, input objects 610 may also include an object c.o, which references an object in a library, d.o.

In block 1 of operation flow 600, computing device 200 may execute linker order determining instructions 210 to determine linker order information 620 for the plurality of input objects, in particular, linker order determining instructions 210 may first parse the user-provided objects, a.o and c.o, to identify any object libraries referenced by these objects. Linker order determining instructions 210 may then parse the identified object libraries to identify any library objects referenced by the user-provided objects and thereby identify b.o, d.o, and e.o. Finally, linker order determining instructions 210 may determine the linker order by first placing any user-provided objects 215 and then placing any referenced objects that are contained in libraries. Thus, in this example, the resulting linker order information 620 may first list all read-only code arranged in the order, a.o, c.o, b.o, d.o, and e.o. The linker order information 620 may then list all read-write code arranged in the order, a.o, c.o, b.o, d.o, and e.o.

In block 2 of operation flow, computing device 200 may execute scatter loading file generating instructions 220 to populate a scatter loading file 630 using the linker order information 620. In particular, as illustrated, scatter loading file generating instructions 220 may first create an execution region, EXEC1, including read-only code for a.o., c.o, and b.o. Scatter loading file generating instructions 220 may then create a second execution region, EXEC2, including read-only code for d.o and e.o. Next, scatter loading file generating instructions 220 may create a third execution region, EXEC3, and populate it with a reference to the read-write code of a.o and c.o. Finally, scatter loading file generating instructions 220 may create a fourth execution region, EXEC4, and include a reference to the read-write code of b.o, d.o., and e.o. As illustrated each of the four execution regions may be placed in the same load region using a relative addressing scheme (i.e., each execution region is offset placed relative to the previous region using the parameter "+0").

In block 3 of operation flow 600, computing device 200 may execute linking instructions 230 to link the objects 610 using the scatter loading file 630. In particular, linking instructions 230 may launch the particular linker, providing the objects 610 and the scatter loading file 630 as input. Thus, as illustrated, the resulting linked executable 640 may be ordered identically to the order of scatter loading file 630.

At some point after the generation of the first linked execution 640, a developer may determine that a software or firmware update is advisable. Accordingly, the developer may generate a new set of objects 650 that contain one or more modified objects. In particular, as illustrated, the new set of objects 650 may remove d.o, while adding a new object, f.o. Accordingly, in block 4 of operation flow 600, computing device 200 may again execute linker order determining instructions 210 to determine linker order information 660 for the objects 650. As illustrated, linker order determining instructions 210 may output linker order information 660, which will be arranged identically to order information 620, but for the insertion of f.o after c.o and the deletion of d.o.

In block 5 of operation flow 600, computing device 200 may execute scatter loading file generating instructions 220 to populate a scatter loading file 670 using the linker order information 660. As illustrated, the order of scatter loading file 670 is similar to that of scatter loading file 630, except for the insertion of f.o in execution regions EXEC1 and EXEC4, and the deletion of d.o from execution regions EXEC 2 and EXEC4.

In block 6 of operation flow 600, computing device 200 may link the executable using the objects 650 and the scatter loading file 670. In particular, computing device 200 may launch the particular linker, providing objects 650 and scatter loading file 670 as input. The resulting executable file 680 for the second version may reflect the ordering of scatter loading file 670.

After generation of the second version of the executable file 680, computing device 200 may be ready to generate an update package to create the second version 680 from the first version 640. Thus, in block 7 of operation flow 600, computing device 200 may execute update package generating instructions 240 to generate an executable file that uses first version 640 as a baseline for generating second version 680. An abstraction of such an update package is illustrated as update package 690. In particular, update package 690 may contain instructions to remove d.o and insert to after c.o. Again, because the ordering of scatter loading files 630, 670 is based on the linker inner order, executables 640, 680 may both be arranged in a similar manner. Accordingly, update package 690 minimizes the need to shift the location of objects when updating from first version 640 to second version 680, thereby minimizing the update package size and reducing installation time.

According to the foregoing, various embodiments relate to generating and using a scatter loading file to link objects in an order that remains consistent between versions of an executable file. In this manner, differences between subsequent versions of the executable file may be minimized, thereby allowing for an update package of significantly reduced size. Accordingly, software or firmware maintained on a client device may be updated by transmitting the update package to the client and applying the update package to the current executable maintained on the client device in a manner that minimizes transmission length, bandwidth usage, and installation time.

I claim:

1. A method for linking executable files to minimize update package size, the method comprising:
   determining a first linker order for a first plurality of objects in a plurality of execution regions in a first version of an executable file, the first linker order indicating an inner ordering imposed by a linker on the first plurality of objects, wherein the first linker order is based on an assumption that the first plurality of objects were placed in a single execution region;
   generating a first scatter loading file for the first version of the executable file, the first scatter loading file grouping the first plurality of objects into a plurality of execution regions using the first linker order;
   linking the first plurality of objects using the first scatter loading file to create the first version of the executable file;
   determining a second linker order for a second plurality of objects in a plurality of execution regions in a second version of the executable file, the second linker order indicating an inner ordering imposed by the linker on the second plurality of objects, wherein the second linker order is based on an assumption that the first plurality of objects were placed in a single execution region;
   generating a second scatter loading file for the second version of the executable file, the second scatter loading file grouping the second plurality of objects into a plurality of execution regions using the second linker order;
   linking the second plurality of objects using the second scatter loading file to create the second version of the executable file; and
   generating an update package, the update package containing instructions to generate the second version of the executable file using the first version of the executable file.

2. The method of claim 1, wherein determining the first and second linker orders comprises, for each respective plurality of objects:
   identifying any object libraries referenced by the respective plurality of objects;
   parsing the identified object libraries to identify any library objects referenced by the respective plurality of objects; and
   determining a respective linker order of the respective plurality of objects and the referenced library objects based on object ordering properties of a particular linker used for linking the first and second plurality of objects.

3. The method of claim 1, wherein determining the first and second linker order is based on an assumption that all objects are to be included in a single execution region.

4. The method of claim 1, wherein generating the first and second scatter loading files comprises, for each respective executable file:
   organizing the objects to be included in the respective executable file into a plurality of execution regions, wherein an ordering between and within the execution regions follows the determined linker order.

5. A non-transitory machine-readable storage medium encoded with instructions executable by a processor of a computing device, the non-transitory machine-readable storage medium comprising:
   instructions for determining a first linker order for a first plurality of objects in a plurality of execution regions for a first version of an executable file, the first linker order indicating an inner ordering imposed by a linker on the first plurality of objects, wherein the first linker order is based on an assumption that the first plurality of objects were placed in a single execution region;
   instructions for generating a first scatter loading file for the first version of the executable file, the first scatter loading file ordering the first plurality of objects using the first linker order;
   instructions for linking the first plurality of objects using the first scatter loading file to create the first version of the executable file;
   instructions for determining a second linker order for a second plurality of objects in a plurality of execution regions for a second version of an executable file, the second linker order indicating an inner ordering imposed by a linker on the second plurality of objects, wherein the second linker order is based on an assumption that the second plurality of objects were placed in a single execution region;
   instructions for generating a second scatter loading file for the second version of the executable file, the second scatter loading file ordering the second plurality of objects using the second linker order; and
   instructions for linking the second plurality of objects using the second scatter loading file to create the second version of the executable file.

6. The non-transitory machine-readable storage medium of claim 5, further comprising:
   instructions for generating an update package, the update package containing instructions to generate the second version of the executable file using the first version of the executable file.

7. The non-transitory machine-readable storage medium of claim 6, wherein the first version of the executable file and the second version of the executable file each correspond to a respective firmware version of a client device.

8. The non-transitory machine-readable storage medium of claim 5, wherein the instructions for determining the first linker order comprise:
   instructions for parsing each of the first plurality of objects to identify any object libraries referenced by the first plurality of objects;
   instructions for parsing each of the referenced object libraries to identify any library objects referenced by the first plurality of objects; and
   instructions for outputting the first linker order based on a determined ordering of the first plurality of objects and the library objects referenced by the first plurality of objects.

9. The non-transitory machine-readable storage medium of claim 8, wherein the instructions for outputting the first linker order determine the ordering based on object ordering properties of a particular linker to be used by the instructions for linking the first plurality of objects.

10. The non-transitory machine-readable storage medium of claim 5, wherein the instructions for generating the first scatter loading file comprise:
    instructions for determining a size of each object of the plurality of objects; and
    instructions for organizing the plurality of objects into execution regions based on a maximum execution region size and the size of each object, wherein each execution region orders objects according to the first linker order.

11. The non-transitory machine-readable storage medium of claim 5, wherein the first scatter loading file explicitly lists every object included in or referenced by the first plurality of objects using the first linker order.

12. A computing device comprising:
a processor; and
a machine-readable storage medium encoded with instructions executable by the processor, the machine-readable storage medium comprising:
instructions for determining a first linker order for a first plurality of objects in a plurality of execution regions for a first version of an executable file, the first linker order specifying a linker inner ordering, wherein the first linker order is based on an assumption that the first plurality of objects were placed in a single execution region,
instructions for generating a first scatter loading file for the first version of the executable file, the first scatter loading file ordering objects using an order specified in the first linker order,
instructions for linking the first plurality of objects for the first version of the executable file using the first scatter loading file to create the first version of the executable file,
instructions for determining a second linker order for a second plurality of objects in a plurality of execution regions for a second version of an executable file, the second linker order specifying a linker inner ordering, wherein the second linker order is based on an assumption that the second plurality of objects were placed in a single execution region,
instructions for generating a second scatter loading file for the second version of the executable file, the second scatter loading file ordering objects using an order specified in the second linker order,
instructions for linking the second plurality of objects for the second version of the executable file using the second scatter loading file to create the second version of the executable file, and
instructions for generating an update package, the update package containing instructions to generate a subsequent version of the executable file using a previous version of the executable file.

13. The computing device of claim 12, wherein:
when the subsequent version of the executable file removes a particular object from the previous version of the executable file, the respective linker order for the subsequent version is the same as the respective linker order for the previous version with the particular object removed.

14. The computing device of claim 12, wherein:
when the subsequent version of the executable file adds a particular object to the previous version of the executable file, the respective linker order for the subsequent version is the same as the respective linker order for the previous version with the particular object inserted.

15. The computing device of claim 12, wherein:
when the objects included in the subsequent version of the executable file and the previous version of the executable file are the same, the respective linker order is identical for both versions.

\* \* \* \* \*